(12) United States Patent
Fripp et al.

(10) Patent No.: US 8,714,262 B2
(45) Date of Patent: May 6, 2014

(54) METHODS OF LIMITING OR REDUCING THE AMOUNT OF OIL IN A SEA USING A FLUID DIRECTOR

(75) Inventors: Michael L. Fripp, Carrollton, TX (US); Jason D. Dykstra, Carrollton, TX (US)

(73) Assignee: Halliburton Energy Services, Inc, Houston, TX (US)

( * ) Notice: Subject to any disclaimer, the term of this patent is extended or adjusted under 35 U.S.C. 154(b) by 254 days.

(21) Appl. No.: 13/180,597

(22) Filed: Jul. 12, 2011

(65) Prior Publication Data

US 2013/0014955 A1   Jan. 17, 2013

(51) Int. Cl.
*E21B 43/36* (2006.01)
*F17D 3/00* (2006.01)

(52) U.S. Cl.
USPC ........... 166/344; 166/345; 166/357; 166/363; 166/364; 175/209; 137/236.1

(58) Field of Classification Search
CPC ............................ E02B 15/048; E21B 43/0122
USPC ................. 166/344, 345, 357, 363, 364, 386; 175/206, 207, 209; 285/131.1, 132.1; 137/806, 807, 803, 2
See application file for complete search history.

(56) References Cited

U.S. PATENT DOCUMENTS

| | | |
|---|---|---|
| 3,566,900 A | 3/1971 | Black |
| 3,586,104 A | 6/1971 | Hyde |
| 3,620,238 A | 11/1971 | Kawabata |
| 3,712,321 A | 1/1973 | Bauer |

(Continued)

FOREIGN PATENT DOCUMENTS

| | | |
|---|---|---|
| WO | WO 2010053378 A2 | 5/2010 |
| WO | WO 2010087719 A1 | 8/2010 |

(Continued)

OTHER PUBLICATIONS

Angrist, Fluid Control Devices, Scientific American, Dec. 1964, pp. 80-88, USA.

(Continued)

*Primary Examiner* — James Sayre
(74) *Attorney, Agent, or Firm* — Scott Wendorf; Sheri Higgins Law; Sheri Higgins

(57) ABSTRACT

According to an embodiment, a method of limiting the amount of oil in a sea comprises: positioning a device for directing the flow of a fluid adjacent to a wellhead, wherein the device comprises: a first fluid passageway; a second fluid passageway; a third fluid passageway, wherein the first fluid passageway is operatively connected to the second and third fluid passageways; and a fluid director, wherein the fluid director is operatively connected to the first, second, and third fluid passageways, and wherein depending on at least one of the properties of a fluid, the fluid director directs the fluid to increasingly flow into the second or third fluid passageways. This embodiment is useful in limiting the amount of oil when a blowout has occurred. According to another embodiment, a method of reducing the amount of oil in a sea comprises: inserting at least one component of the device for directing the flow of a fluid into a portion of a sea, wherein the portion of the sea comprises the oil, and wherein depending on at least one of the properties of a fluid, the fluid director directs the fluid to increasingly flow into the second or third fluid passageways. This embodiment is useful for reducing the amount of oil in a sea when an oil slick has occurred.

22 Claims, 6 Drawing Sheets

(56) References Cited

U.S. PATENT DOCUMENTS

| | | |
|---|---|---|
| 4,276,943 A | 7/1981 | Holmes |
| 4,282,097 A * | 8/1981 | Kuepper et al. ............... 210/200 |
| 4,323,118 A * | 4/1982 | Bergmann .................. 166/96.1 |
| 4,323,991 A | 4/1982 | Holmes et al. |
| 4,418,721 A | 12/1983 | Holmes |
| 4,557,295 A | 12/1985 | Holmes |
| 4,895,582 A | 1/1990 | Bielefeldt |
| 5,076,327 A | 12/1991 | Mettner |
| 5,080,783 A * | 1/1992 | Brown ..................... 210/170.05 |
| 6,497,252 B1 | 12/2002 | Kohler et al. |
| 7,828,067 B2 | 11/2010 | Scott et al. |
| 8,016,030 B1 * | 9/2011 | Prado Garcia ............. 166/75.13 |
| 8,025,103 B1 * | 9/2011 | Wolinsky ...................... 166/364 |
| 8,083,935 B2 * | 12/2011 | Eia ............... 210/96.1 |
| 8,196,665 B2 * | 6/2012 | Wolinsky ..................... 166/356 |
| 8,316,963 B2 * | 11/2012 | Eia et al. ............................ 175/5 |
| 2009/0120647 A1 | 5/2009 | Turick et al. |
| 2011/0042092 A1 | 2/2011 | Fripp et al. |
| 2011/0042323 A1 * | 2/2011 | Sullivan, II ................... 210/744 |
| 2011/0198097 A1 | 8/2011 | Moen |
| 2012/0305260 A1 * | 12/2012 | Paturu .......................... 166/352 |

FOREIGN PATENT DOCUMENTS

| | | |
|---|---|---|
| WO | WO 2011041674 A2 | 4/2011 |
| WO | WO 2011095512 A2 | 8/2011 |
| WO | WO 2011115494 A1 | 9/2011 |

OTHER PUBLICATIONS

Wright et al., The Development and Application of HT/HP Fiber Optic Connectors for Use on Subsea Intelligent Wells, OTC 15323, May 2003, pp. 1-8, for Presentation in 2003 OTC Conference in Houston, Texas, USA.

Freyer et al., An Oil Selective Inflow Control System, SPE 78272, Oct. 2002, pp. 1-8, for Presentation in 2002 SPE Conference in Aberdeen, Scotland, U.K.

* cited by examiner

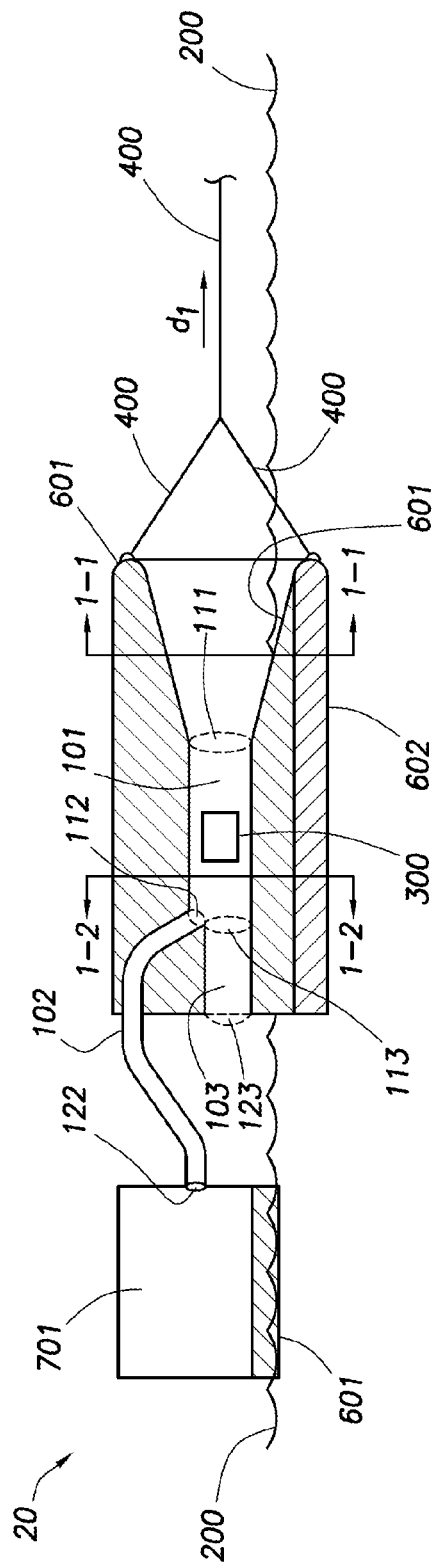
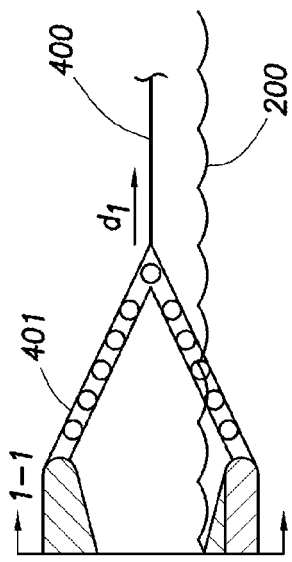

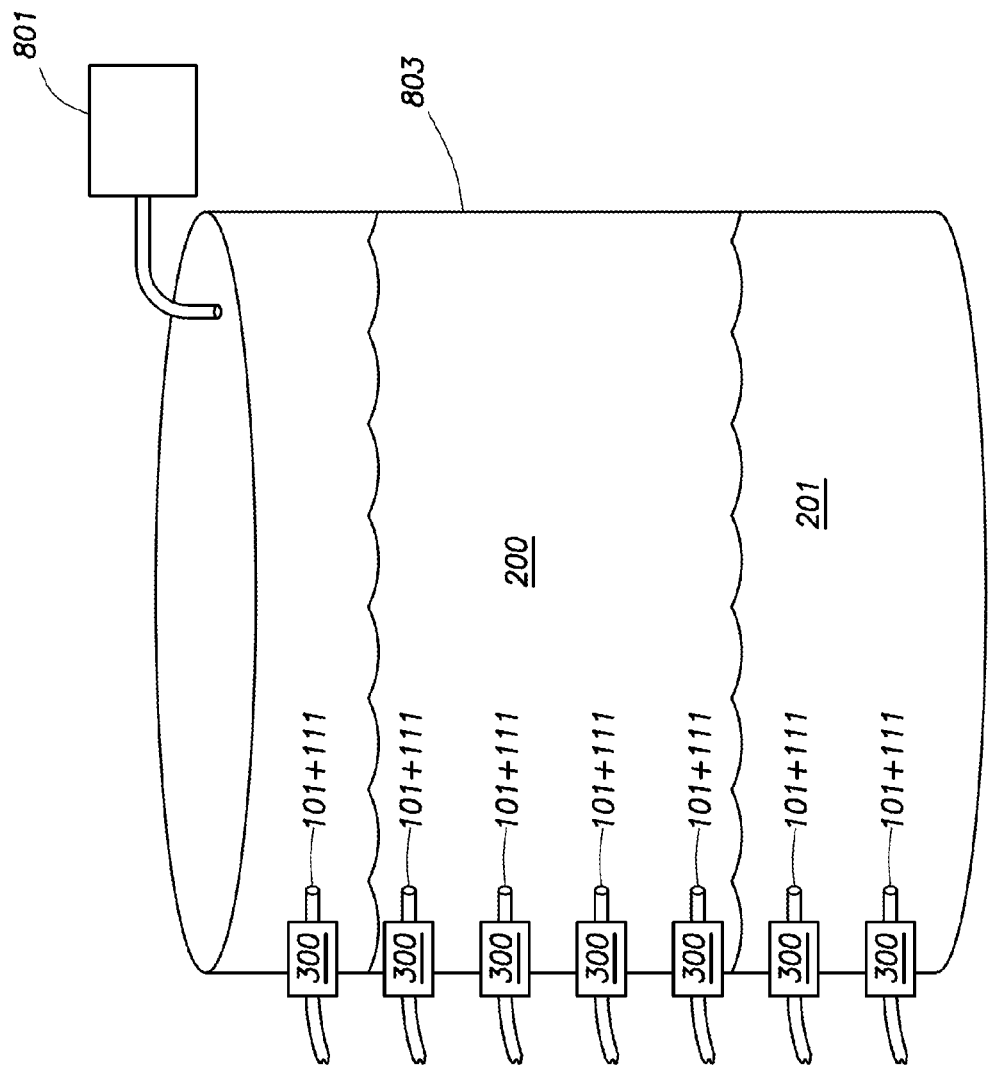

US 8,714,262 B2

METHODS OF LIMITING OR REDUCING THE AMOUNT OF OIL IN A SEA USING A FLUID DIRECTOR

TECHNICAL FIELD

Methods of cleaning up an oil slick in a sea are provided. According to certain embodiments the oil, an oil and seawater mixture, or the seawater are introduced into a fluid director. The fluid director can direct the fluid to flow into two or more fluid passageway depending on at least one property of the fluid. According to an embodiment, if the fluid flowing through one of the passageways is only seawater, then the seawater is returned to the sea. According to another embodiment, if the fluid flowing through the other passageway is oil or an oil/seawater mixture, then it is collected.

SUMMARY

According to an embodiment, a method of limiting the amount of oil in a sea comprises: positioning a device for directing the flow of a fluid adjacent to a wellhead, wherein the device comprises: a first fluid passageway; a second fluid passageway; a third fluid passageway, wherein the first fluid passageway is operatively connected to the second and third fluid passageways; and a fluid director, wherein the fluid director is operatively connected to the first, second, and third fluid passageways, and wherein depending on at least one of the properties of a fluid, the fluid director directs the fluid to increasingly flow into the second or third fluid passageways.

According to another embodiment, a method of reducing the amount of oil in a sea comprises: inserting at least one component of a device for directing the flow of a fluid into a portion of a sea, wherein the portion of the sea comprises the oil, and wherein the device comprises: a first fluid passageway; a second fluid passageway; a third fluid passageway, wherein the first fluid passageway is operatively connected to the second and third fluid passageways; and a fluid director, wherein the fluid director is operatively connected to the first, second, and third fluid passageways, and wherein depending on at least one of the properties of a fluid, the fluid director directs the fluid to increasingly flow into the second or third fluid passageways.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIG. 3 is a diagram of the device for reducing the amount of oil in a sea when an oil slick exists by operatively connecting the device to a vessel.

FIG. 4 depicts the device of FIG. 3 taken along line 1-1 further including a filter.

FIG. 8 depicts an optional settling tank on the device from FIG. 7.

DETAILED DESCRIPTION

Figure 1:
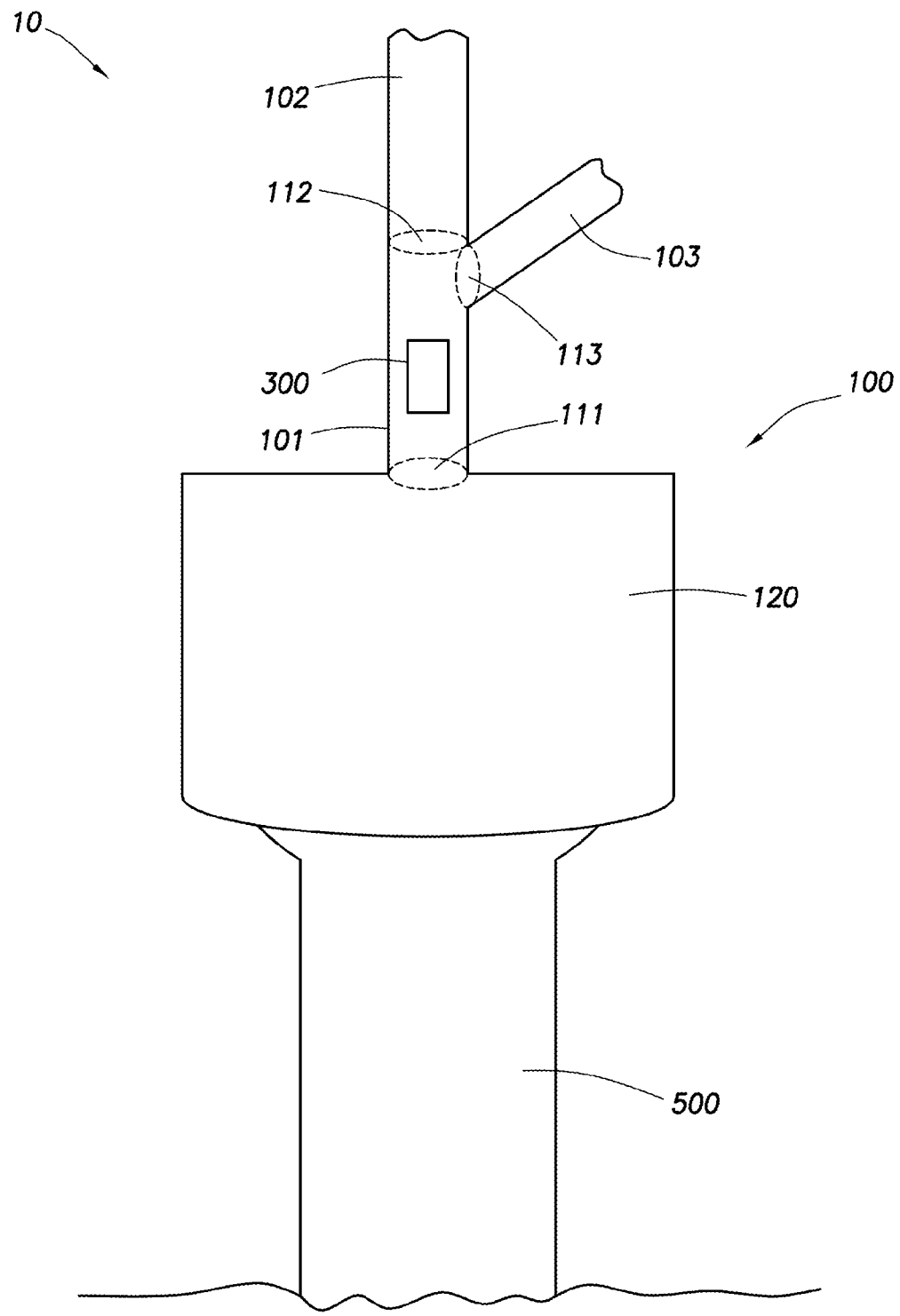
FIG. 1 is a diagram of one device for directing the flow of a fluid into two or more fluid passageway for limiting the amount of oil in a sea when a blowout has occurred.

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more fluid passageways, fluid directors, etc., as the case may be, and does not indicate any sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase, whereas a heterogeneous fluid has more than one distinct phase. One of the physical properties of a fluid is its density. Density is the mass per unit of volume of a substance, commonly expressed in units of pounds per gallon (ppg) or kilograms per liter (kg/L). Fluids can have different densities. For example, the density of deionized water is approximately 1 kg/L; whereas the density of crude oil is approximately 0.865 kg/L. A homogenous fluid will have only one density; however, a heterogeneous fluid will have at least two different densities. For example, one of the phases in a heterogeneous fluid will have a specific density and each of the other phases in the heterogeneous fluid will have a different density. Another physical property of a fluid is its viscosity. Viscosity is a measure of the resistance of a fluid to flow, defined as the ratio of shear stress to shear rate. Viscosity can be expressed in units of (force*time)/area. For example, viscosity can be expressed in units of dyne*s/cm$^2$ (commonly referred to as Poise (P)), or expressed in units of Pascals/second (Pa/s). However, because a material that has a viscosity of 1 P is a relatively viscous material, viscosity is more commonly expressed in units of centipoise (cP), which is $\frac{1}{100}$ P. Viscosity can include, but is not limited to, dynamic viscosity, shear strength, yield strength, pseudoplasticity, viscoplasticity, and surface tension.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In off-shore drilling, a production tubing is inserted into a body of water and extends through the water to the sea floor. A wellbore is then drilled through the sub-sea land into a reservoir or adjacent to a reservoir. The wellhead is located at or near the top of the sea floor. The body of water and the wellbore can be several hundred to several thousands of feet deep. As used herein, the term "sea" and all grammatical variations thereof, means a body of water and includes, without limitation, a river, a pond, a lake, a gulf, or an ocean. As used herein, the term "seawater" means the water located within the sea. The seawater can be freshwater, salt water, or brackish water.

As used herein, the term "oil" means a liquid comprising a hydrocarbon when measured at a temperature of 71° F. (21.7° C.) and a pressure of one atmosphere. Examples of oil include, but are not limited to: crude oil; a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

An oil slick can occur when oil contaminates seawater. During off-shore oil production, a component of the drilling rig or production tubing may become damaged to such an extent that oil may no longer be contained in the system, but rather, may flow into the surrounding water. An example of such damage is when a blowout occurs. A blowout is the uncontrolled release of oil and/or natural gas from a well after pressure control systems have failed. A blowout can occur: at the wellhead located at the seafloor in off-shore drilling; at the wellhead located on land; or underground. In some instances the oil may be harmful to the environment if not contained; whereas the gas may not be harmful. Therefore, it may be desirable to only collect and contain the oil while allowing the gas to return to the surrounding environment. A common technique for trying to control the flow of oil and/or gas in a blowout is to cap the well. Capping a well is a term used to describe the process of placing a cap above a wellhead in a blowout. The cap can be attached to a casing whereby the oil is funneled into the casing via the cap. The fluid can then flow through the casing to the surface of the sea and be collected. However, depending on the temperature at the wellhead, some or all of the gas may form gas hydrates. Gas hydrates occur naturally onshore in permafrost regions, and at certain depths in the sea where water and gas combine at low temperatures and high pressures to form the hydrate. Methane, or natural gas, is typically the dominant gas in the hydrate structure. As gas emerges from the wellhead, water molecules from the surrounding environment form a cage-like structure around high concentrations of the gas molecules and freeze into a solid gas/water structure. If a sufficient amount of gas hydrates form, the hydrates can block or clog valves and pipes leading to the surface from the cap. As a result, some or all of the oil being emitted from the wellhead may flow into the surrounding environment (e.g., the seawater) and can cause an oil slick.

Another way an oil slick can be caused is when a ship transporting oil is damaged during transit such that oil leaks out from the holding containers on the ship into the seawater.

If an oil slick occurs, there are several methods for cleaning up the oil in the seawater. One method involves inserting several booms into the seawater. Because oil is less dense than seawater, the oil will tend to float on top of the seawater. The floating oil can define the geographic boundaries of the oil slick. The booms can be inserted at a location outside the geographic perimeter of the oil slick. A boom generally includes a float located at the top of the boom, a wide, solid piece of material extending down from the float, and a weight at the bottom of the boom. Much like a buoy, the boom floats on the surface of the seawater and its orientation is maintained by the weight. The solid piece of material helps to trap the oil in the space between the booms. Workers then try to collect the trapped oil using a variety of techniques, including the use of a skimmer pump. Booms, however, are not very effective at containing oil in rough seas. If the sea waves are high enough, then the oily seawater can be washed over the top of the float of the boom by the large waves, causing at times, significant amounts of oil to be displaced from the containment area. Another disadvantage to traditional clean-up techniques is that the amount of oil collected is limited by the volume of the collection container. For example, if a skimmer pump is used to siphon off the top layer of oily seawater, then oil as well as seawater will be transferred to the container. Because seawater is also collected along with the oil, the tank can fill up rather quickly. Moreover, because seawater is not harmful to the environment, it is not necessary to collect seawater, but only oil. Yet another technique for clean-ups is the use of a porous membrane to collect the oil. The pores of a membrane are prone to clogging and the use of a membrane requires a relatively large pressure differential to force the fluid through the porous membrane. Therefore, there exists a need to: effectively limit the amount of oil that can contaminate seawater in the event of a blowout; effectively collect oil from an oil slick in calm and rough seas; and collect as much oil and as little seawater as possible in a collection container.

A novel method for limiting the amount of oil in a sea uses a fluid director to direct the oil into a storage tank while directing fluid that does not contain the oil back into the sea. This method can be used in conjunction with capping a well when a blowout has occurred. Another novel method for reducing the amount of oil in a sea uses a fluid director to direct the oil into a storage tank while directing fluid that does not contain the oil back into the sea. This method can be used for cleaning up an oil slick. Some of the advantages of the methods include: any amount of oil that has already been collected is not lost if the seas are rough compared to the loss of contained oil that could occur in rough seas using booms; and by being able to discard liquids that are not harmful to the surrounding environment, more oil can be placed into a storage tank. The fluid director is part of a device, wherein the device is not a boom nor a membrane.

According to an embodiment, a method of limiting the amount of oil in a sea comprises: positioning a device for directing the flow of a fluid adjacent to a wellhead, wherein the device comprises: a first fluid passageway; a second fluid passageway; a third fluid passageway, wherein the first fluid passageway is operatively connected to the second and third fluid passageways; and a fluid director, wherein the fluid director is operatively connected to the first, second, and third fluid passageways, and wherein depending on at least one of the properties of a fluid, the fluid director directs the fluid to increasingly flow into the second or third fluid passageways.

Any discussion of a particular component of the device 100 (e.g., a second fluid passageway 102) is meant to include the singular form of the component and also the plural form of the component, without the need to continually refer to the component in both the singular and plural form throughout. For example, if a discussion involves "the second fluid passageway 102," it is to be understood that the discussion pertains to one second fluid passageway (singular) and two or more second fluid passageways (plural). It is also to be understood that any discussion of a particular component or particular embodiment regarding a component is meant to apply to all of the method embodiments, without the need to re-state all of the particulars for every method embodiment.

The device for directing the flow of the fluid 100 is designed to be an independent device, i.e., it is designed to automatically direct the fluid to flow into either the second or third fluid passageways based on at least one of the properties of the fluid, without any external intervention. According to certain embodiments, the at least one of the properties is the viscosity or density of the fluid.

The components of the device for directing the flow of a fluid 100 can be made from a variety of materials. Examples of suitable materials include, but are not limited to: metals, such as steel, aluminum, titanium, and nickel; alloys; plastics; composites, such as fiber reinforced phenolic; ceramics, such as tungsten carbide or alumina; elastomers; fiberglass; and dissolvable materials.

Figure 2:
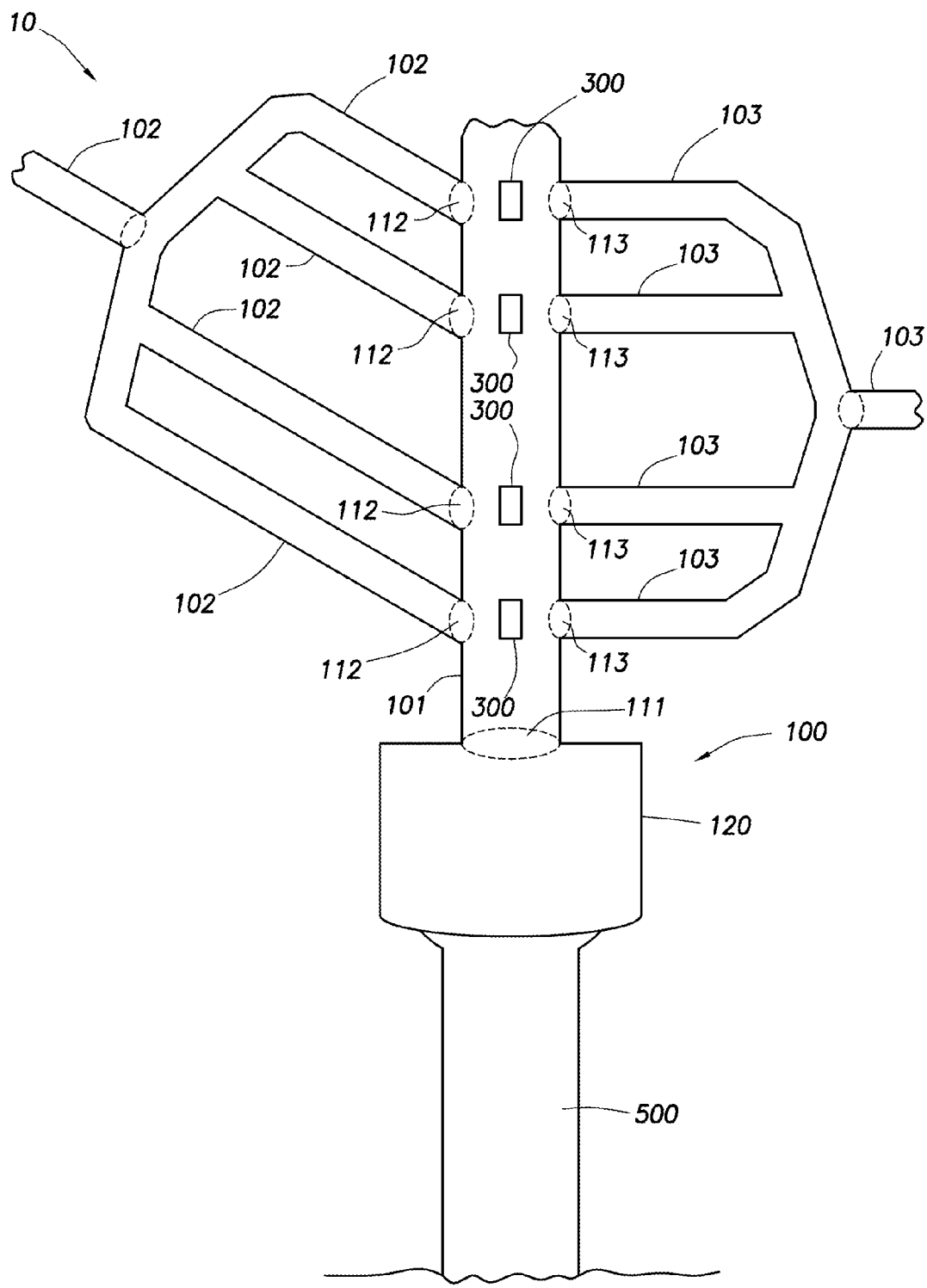
FIG. 2 is a diagram of multiple devices for limiting the amount of oil in a sea when a blowout has occurred.

Turning to the Figures. FIGS. 1 and 2 are diagrams of the device for directing the flow of a fluid for use in limiting the amount of oil in a sea 10. The device 100 includes a first fluid passageway 101. The first fluid passageway 101 (and any other passageways) can be any cross-sectional shape, including, but not limited to, tubular, rectangular, pyramidal, or curlicue in shape. The first fluid passageway 101 can include a first fluid inlet 111. A wellbore includes a wellhead 500. The wellhead 500 can be located in an area where gas hydrates are likely to form and can also be located in an area where gas hydrates are not likely to form. According to an embodiment, the first fluid passageway 101 is connected to a cap 120. In areas where hydrates are likely to form (e.g., permafrost regions and sea floors at certain depths), the device 100 can be positioned at a location adjacent to the wellhead 500 such that the amount of gas hydrates formed is reduced. For example, the cap 120 including the device 100 can be positioned as close to the top of the wellhead 500 as possible. At least a portion of the device 100 can also be positioned inside an upper area of the wellhead 500 (not shown). Accordingly, the device 100 does not need to be connected to the cap 120, but rather a portion of the device can be positioned directly inside the wellhead 500. For example, the portion of the first fluid passageway 101 that includes the first fluid inlet 111 can be positioned inside the wellhead 500. The portion of the device 100 can be positioned such that preferably, all of the fluid flowing through the wellhead 500 enters the first fluid passageway 101. This can limit the amount of fluid that flows into the seawater. These embodiments may limit the amount of exposure the gas emissions have to the water and temperature/pressure necessary for forming gas hydrates. The fewer gas hydrates formed, the greater chance that the valves, passageways, etc. will not become clogged with hydrates. According to another embodiment, the cap is heated to a temperature at or above the temperature necessary for preventing gas hydrate formation. By heating the cap, even if some gas hydrate formation occurs, then the heat from the cap may help dissolve the ice-crystal structure surrounding the gas molecules. The first fluid passageway 101 can also be heated. As the oil and/or gas is emitted from the wellhead 500, the fluid will flow into the first fluid passageway 101 via the first fluid inlet 111.

The device 100 includes a fluid director 300 operatively connected to the first, second, and third fluid passageways 101, 102, and 103. The second fluid passageway 102 includes a second fluid inlet 112, and the third fluid passageway 103 includes a third fluid inlet 113. The fluid director 300 can be any device that is capable of directing the flow of a fluid into two or more different fluid passageways. For example, the fluid director 300 can direct a fluid into the second fluid passageway 102, the third fluid passageway 103, and combinations thereof. The fluid director 300 can be selected from the group consisting of a pressure switch, a centrifugal switch, a bistable switch, and a proportional switch. According to certain embodiments, there is more than one fluid director 300 used to limit or restrict the amount of oil in a sea. When more than one fluid director 300 is used, the fluid directors 300 can be the same or different. For example, one of the fluid directors can be a pressure switch while another fluid director can be a centrifugal switch.

Depending on at least one of the properties of the fluid, the fluid director 300 directs the fluid to increasingly flow into the second fluid passageway 102 or the third fluid passageway 103. The at least one of the properties can be viscosity or density. The fluid director 300 can be selected to function with a specific property of the fluid. For example, if the selected property is viscosity, then the fluid director 300 may be selected such that based on the viscosity of the fluid, the director directs the fluid to increasingly flow into the second or third fluid passageways. The selected property can also be the density of the fluid or the density of each phase of a heterogeneous fluid. Of course one particular type of fluid director can direct the fluid based on viscosity, density, or both.

The fluid entering the first fluid passageway 101 can be a homogenous fluid or a heterogeneous fluid. The entering fluid can also change from a homogenous fluid to a heterogeneous fluid and vice versa. Every fluid will have a unique viscosity and density. For example, if the fluid is seawater, then the seawater will have a specific viscosity and density; whereas, if the fluid is oil, then the oil will have a different viscosity and density. Moreover, an emulsion of seawater and oil will have yet another viscosity and density. The fluid director 300 can be selected such that as the viscosity of the fluid increases, the director directs the fluid to increasingly flow into the second fluid passageway 102 and as the viscosity decreases, the director directs the fluid to increasingly flow into the third fluid passageway 103. The fluid director 300 can also be selected such that as the density of the fluid decreases, the director directs the fluid to increasingly flow into the second fluid passageway 102 and as the density of the fluid increases, the director directs the fluid to increasingly flow into the third fluid passageway 103. Any of the devices 100 can further include an additional fluid inlet 802 (discussed in more detail below regarding FIG. 7). The additional fluid inlet 802 can be used to add a fluid, such as a surfactant. The surfactant can be used to create a better emulsion of the fluid flowing through the first fluid passageway 102. A better emulsion can increase the viscosity of the fluid, which can, among other things, allow the fluid director 300 to detect small quantities of oil in the fluid.

A density switch can include a chamber. Depending on at least one of the properties of the fluid, the fluid rotationally flows closer to the outside of the chamber, closer to the center of the chamber, or closer to the outside and closer to the center of the chamber. For example, the density or viscosity of a homogenous fluid dictates the location within the chamber the fluid will rotationally flow (e.g., closer to the outside of the chamber or closer to the inside of the chamber). By way of another example, the different densities or the different viscosities of the phases of a heterogeneous fluid dictate the location within the chamber each phase of the fluid will rotationally flow (e.g., closer to the outside of the chamber for one of the phases and closer to the center of the chamber for another one of the phases).

During rotational flow, a fluid having a higher density or higher viscosity will be forced farther towards the outside of the chamber compared to a fluid having a lower density or lower viscosity. This is due, in part, to the increased effect that centripetal and reactive centrifugal forces have on the greater mass or viscosity of the higher density/viscosity fluid. As used herein, the term "outside" means the circumference or perimeter of the chamber. According to an embodiment, the phase of the fluid having a higher density or higher viscosity rotationally flows closer to the outside of the chamber and the phase of the fluid having a lower density or lower viscosity rotationally flows closer to the center of the chamber. While the higher density fluid will flow farther towards the outside of the chamber, the lower density fluid will flow closer towards the center of the chamber.

For a homogenous fluid, the location of the fluid flow (i.e., closer towards the outside or closer towards the center of the chamber) will be dictated by the density or viscosity of the fluid, and thus, the fluid will tend to flow in one location rotationally about the inside of the chamber. For a heterogeneous fluid, the flow location of each phase of the fluid will be dictated by the distinct density or viscosity for each phase. For example, a heterogeneous fluid having three phases with the magnitude of densities or viscosities of the phases being in order of: phase 1<phase 2<phase 3, means that phase 3 will flow the closest towards the outside of the chamber, phase 1 will flow the closest towards the center of the chamber, and phase 2 will flow somewhere in between phase 3 and phase 1. Of course, the exact location of the different phases will be dictated by the actual density or viscosity of each phase. In the preceding example, if the density of phase 2 is closer in value to the density of phase 1 compared to phase 3, then phase 2 will flow closer towards phase 1 about the inside of the chamber and vice versa. The preceding statement is also true for the different viscosities of each phase.

When the fluid director 300 is a centrifugal switch, then the device 100 can also include at least two additional fluid passageways (not shown in the Figures). The additional passageways can be operatively connected to the director 300 such that the fluid exiting the director at a location closer to the outside of the chamber is directed into one of the two passageways, while the fluid exiting at a location closer to the inside of the chamber is directed into the other of the two passageways. The fluid flowing through the additional passageways can conjoin at a point downstream of the director 300. The fluid can conjoin at a junction. The second fluid passageway 102 and the third fluid passageway 103 can be operatively connected to the junction. In this manner, depending on at least one of the properties of the conjoined fluid, the fluid can increasingly flow into the second or third fluid passageway 102/103.

The second fluid inlet 112 can be operatively connected to the director 300 such that a fluid having a higher viscosity or lower density (e.g., oil or an oil and seawater mixture) will be directed into the second fluid passageway 102. The third fluid inlet 113 can be operatively connected to the director 300 such that a fluid having a lower viscosity or higher density (e.g., seawater) will be directed into the third fluid passageway 103.

According to an embodiment, the second fluid passageway 102 is operatively connected to a collection tank 701 (not shown in FIGS. 1 and 2). The second fluid passageway 102 can terminate at the collection tank 701. According to an embodiment, any fluid flowing through the second fluid passageway 102 flows into the collection tank 701. The collection tank 701 can be removably attached to the second fluid passageway 102. The methods can further include the step of detaching a tank that is full of the fluid after the step of positioning or inserting. The methods can also include the step of attaching an empty collection tank to the second fluid passageway 102 after the step of detaching. There can also be more than one collection tank, that can be arranged in series or parallel. If the tanks are arranged in series, then the tanks can be connected to each other in a manner such that as one tank becomes full of the liquid, then the liquid will flow into the next empty tank. According to an embodiment, the third fluid passageway 103 is not connected to a collection tank. According to this embodiment, the third fluid passageway 103 terminates into the sea. As such, any fluid flowing through the third fluid passageway 103 is not collected in the collection tank 701, but rather is discarded back into the sea. As shown in FIG. 2, the device 100 can include more than one fluid director 300, more than one second fluid passageway 102, and more than one third fluid passageway 103. The fluid directors can be connected in parallel or in series. The second and third fluid passageways can be connected in parallel.

The following examples illustrate the use of the device 100 for limiting the amount of oil in a sea. The following examples are not the only examples that could be given and are not intended to be an exhaustive list of all possible uses for the device. These examples are meant to illustrate some methods of limiting the amount of oil in a sea, for example when a blowout has occurred, but the methods could also be used for other applications as well. In a blowout, uncontrolled oil, gas, and possibly water exit the wellhead 500. Assuming little to no gas hydrate formation, when the cap 120 is placed over the wellhead 500, fluid will enter the first fluid passageway 101 via the first fluid inlet 111. If the fluid is seawater, the fluid director 300 can direct the fluid to enter the third fluid passageway 103 via the third fluid inlet 113 based on at least one property of the fluid and exit the second fluid passageway back into the sea. Now, if the composition of the fluid changes from a homogenous seawater fluid to a heterogeneous mixture of seawater and oil, then the viscosity of the fluid will increase and the density will decrease (as oil is more viscous than seawater and less dense). As the viscosity increases or the density decreases, the fluid director 300 can direct the fluid to increasingly flow into the second fluid passageway 102 via the second fluid inlet 112 and the oil/seawater mixture can be collected in the collection tank, which limits the amount of oil in the sea. If only one collection tank is used, then when the collection tank becomes full, the full tank can be replaced with an empty tank. The collection tank can also be operatively connected to a fluid separator whereby the fluid separator separates oil from any seawater present in the fluid. Each phase of the fluid (e.g., oil and seawater) can then be directed into a collection tank or back into the sea.

The collection tank 701 can further include multiple fluid directors 300 in series or in parallel. These fluid directors 300 can be use the further direct the fluid into two or more fluid passageways, wherein the fluid is either directed into the sea or into another fluid director and/or a collection tank.

According to another embodiment, a method of reducing the amount of oil in a sea comprises: inserting at least one component of a device for directing the flow of a fluid into a portion of a sea, wherein the portion of the sea comprises the oil, and wherein the device comprises: a first fluid passageway; a second fluid passageway; a third fluid passageway, wherein the first fluid passageway is operatively connected to the second and third fluid passageways; and a fluid director, wherein the fluid director is operatively connected to the first, second, and third fluid passageways, and wherein depending on at least one of the properties of a fluid, the fluid director directs the fluid to increasingly flow into the second or third fluid passageways. This method may be useful for cleaning up an oil slick.

This method includes the step of inserting at least one component of the device 100 for directing the flow of a fluid into a portion of the sea. As can be seen in FIGS. 3-6, more than one, or all of the components, of the device 100 can be inserted into the portion of the sea. The device 100 can be used in conjunction with a vessel to reduce the amount of oil in a sea. The methods can further include the step of positioning the device 100 into a portion of the sea. According to this embodiment, the device 100 can be part of a collection system 20. The collection system 20 can include at least one float 601. The collection system 20 can include two or more floats 601. According to an embodiment, the device 100 is positioned between the two or more floats 601. The collection system 20 can further include a weight 602. According to an embodiment, the float 601, the weight 602, and the device 100 are configured such that fluid can enter the first fluid passageway 101 (located between the floats 601) and flow towards the fluid director 300. The fluid can be oil or an oil/seawater mixture 200 or it can be only seawater 201. The collection system 20 is preferably designed such that it is capable of being moved through the sea, which is discussed in more detail below. The float 601 and the weight 602 can also be arranged such that the two components form a bow. The bow can function to help funnel the fluid into the first fluid passageway 101 via the first fluid inlet 111. For example, the bow can help prevent the fluid from flowing over the top of the collection system 20 and channel the fluid to enter the first fluid passageway 101. This embodiment can be useful in calm seas and in rough seas. According to another embodiment, the float 601 and the weight 602 can be configured such that the flow rate of the fluid entering the first fluid passageway 101 is relatively constant. For example, in rough seas, the float 601 and the weight 602 can be configured such that if a large wave contacts the system 20, then some of the fluid can flow over the top of the system via the bow, which can help prevent an increase in flow rate or a surge of fluid entering the first fluid passageway 101.

The collection system 20 can further include a filter 401, wherein the filter 401 is connected to the bow. The filter 401 can be made from a porous material. The porous material can help prevent solid matter (e.g., seaweed or debris) from entering the first fluid passageway 101, while allowing the fluid to enter the first fluid passageway 101. The filter 401 can include pores having a size in the range of about 0.1 cm to about 10 cm.

As mentioned above, the collection system 20 is preferably designed such that it is capable of being moved through the sea. The collection system 20 can also be designed such that it remains relatively stationary after it has been inserted into the sea. This embodiment may be useful when the seawater is capable of flowing into the device 100. For example, if the sea is a river, then the fluid in the river may naturally flow in a given direction. If the fluid in the sea naturally flows in a given direction, then the system 20 can be positioned in relation to the given direction such that the fluid enters the first fluid passageway 101. In this manner, the system 20 may not need to be moved through the sea, but rather the oil/seawater mixture 200 will flow into the device 100. The methods can include the step of causing fluid to flow into the first fluid passageway 101 after the step of inserting. Preferably, the fluid is oil or an oil/seawater mixture 200. The step of causing can include moving the collection system 20 through the sea. According to an embodiment, the collection system 20 can be moved through the sea by pulling. According to this embodiment, the collection system 20 can further include a towing line 400. The towing line 400 can be attached at one end to the bow of the system 20 and attached at the other end to a vessel. The vessel is not shown in FIGS. 3-5B, but according to this embodiment, would be at a location away from the collection system 20 in the direction of $d_1$. As used herein, the term "vessel" means a craft, especially one larger than a rowboat, that uses an engine to move the craft for navigation on water. For example, the vessel can be a boat or a ship. As can be seen in FIG. 3, the towing line 400 can be attached to the bow of the system 20 via the float 601. As can be seen in FIG. 4, the towing line 400 can be attached to the bow via the filter 401. According to another embodiment, the collection system 20 can be moved through the sea by pushing. According to this other embodiment, the collection system 20 can include a rod (not shown). The rod can be connected at one end to the bow of a vessel and connected at the other end to the stern of the collection system 20. In this manner, the vessel can push the collection system 20 through the sea from behind the system.

The methods can further include the step of moving at least the device 100 through the sea. As the device 100 is moved through the sea, the fluid will flow into the first fluid passageway 101 via the first fluid inlet 111. The fluid will then travel towards the fluid director 300. As discussed above, the fluid director 300 will direct the fluid into the second or third fluid passageway, or both, depending on at least one property of the fluid. For example, oil or an oil/seawater mixture 200 can be directed into the second fluid passageway 102 while only seawater 201 is directed into the third fluid passageway 103.

The third fluid passageway 103 can terminate at the stern of the collection system 20 at the third fluid outlet 123. Any fluid flowing through the third fluid passageway 103 can exit the third fluid passageway 103 via the third fluid outlet 123. Preferably, the only fluid flowing through the third fluid passageway 103 is seawater 201. According to an embodiment, the seawater 201 exits the third fluid passageway 103 into the sea and is not collected.

The second fluid passageway 102 can include a second fluid outlet 122. Any fluid flowing through the second fluid passageway 102 can exit the second fluid passageway 102 via the second fluid outlet 122. The collection system 20 can further include a collection tank 701, wherein the collection tank is operatively connected to the device 100. The collection tank 701 can comprise a chamber. As used herein, a "chamber" means a volume surrounded by a structure, where the structure has at least one opening. The opening can be a fluid inlet. The chamber can also include more than one opening, for example, two inlets, or one inlet and one outlet. Preferably, the only fluid flowing through the second fluid passageway 102 is the oil or a mixture of the oil and seawater 200. The second fluid passageway 102 can terminate at an opening into the collection tank 701. The fluid entering the collection tank 701 can be contained in the tank. As such, the fluid 200 can be recovered from the sea.

Figure 5A:
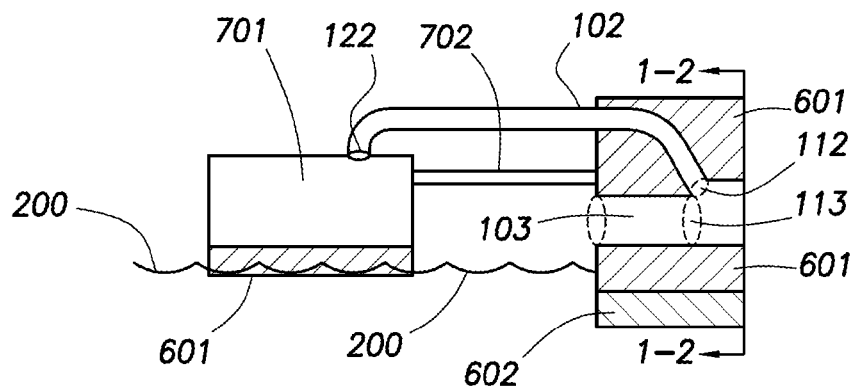
FIGS. 5A and 5B depict the device of FIG. 3 taken along line 1-2 illustrating possible arrangements of the two or more fluid passageways connected to a collection tank.
Figure 5B:
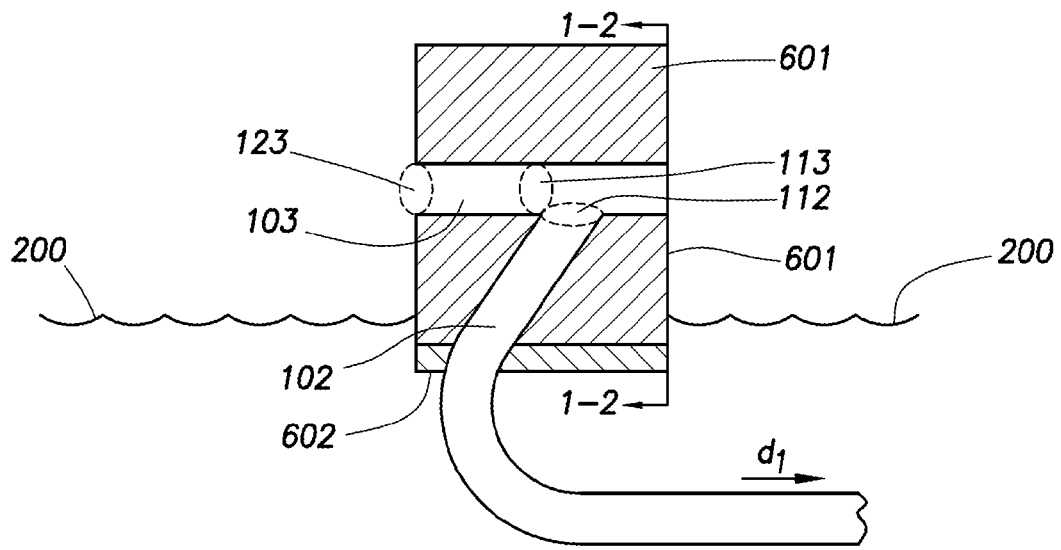

The collection tank 701 can be attached to the device 100 such that the tank moves along with the device through the sea. According to an embodiment, the collection tank 701 is located behind the stern of the device 100. The collection tank 701 can include a float 601 for allowing the tank to float in the sea. As depicted in FIG. 5A, the collection tank 701 can be connected to the device 100 via a connecting line 702. The connecting line 702 can be flexible, and can also be attached at one end to the collection tank 701 and attached at the other end to the stern of the device 100. In this manner, if the device 100 is being pulled by a vessel through the seawater via the towing line 400, then the collection tank 701 can also be pulled and move with the device 100 through the water. According to another embodiment, the collection tank 701 can be located on the vessel. As can be seen in FIG. 5B, the second fluid passageway 102 can be oriented such that the second fluid passageway 102 terminates into the collection tank 701 located on the vessel (not shown). As discussed above, there can be one collection tank 701 or more than one collection tank 701 arranged in series or parallel.

The collection tank 701, whether located in seawater or on the vessel, can be part of a fluid separation system (not shown). The fluid separation system can comprise at least one fluid separator. The collection tank 701 can be operatively connected to the fluid separator. For example, the fluid located inside the collection tank 701 can flow from the tank to the fluid separator. The fluid separator can be, for example, a centrifugal separator. The fluid separator can be used when the fluid flowing through the second fluid passageway 102 into the collection tank 701 is an oil/seawater mixture instead of only the oil. There can be more than one fluid separator arranged in series or parallel. According to an embodiment, based on the density of the fluid entering the fluid separator, the fluid separator directs the less dense fluid into one fluid passageway and directs the denser fluid into another fluid passageway. The another fluid passageway can terminate at an outlet, wherein the fluid exiting the another fluid passageway flows into the sea. The one fluid passageway can terminate at an outlet, wherein the fluid exiting the one fluid passageway flows into a storage tank. The storage tank can be used to store the fluid, preferably consisting of only the oil, for transportation to a disposal site or for processing of the fluid.

Figure 6:
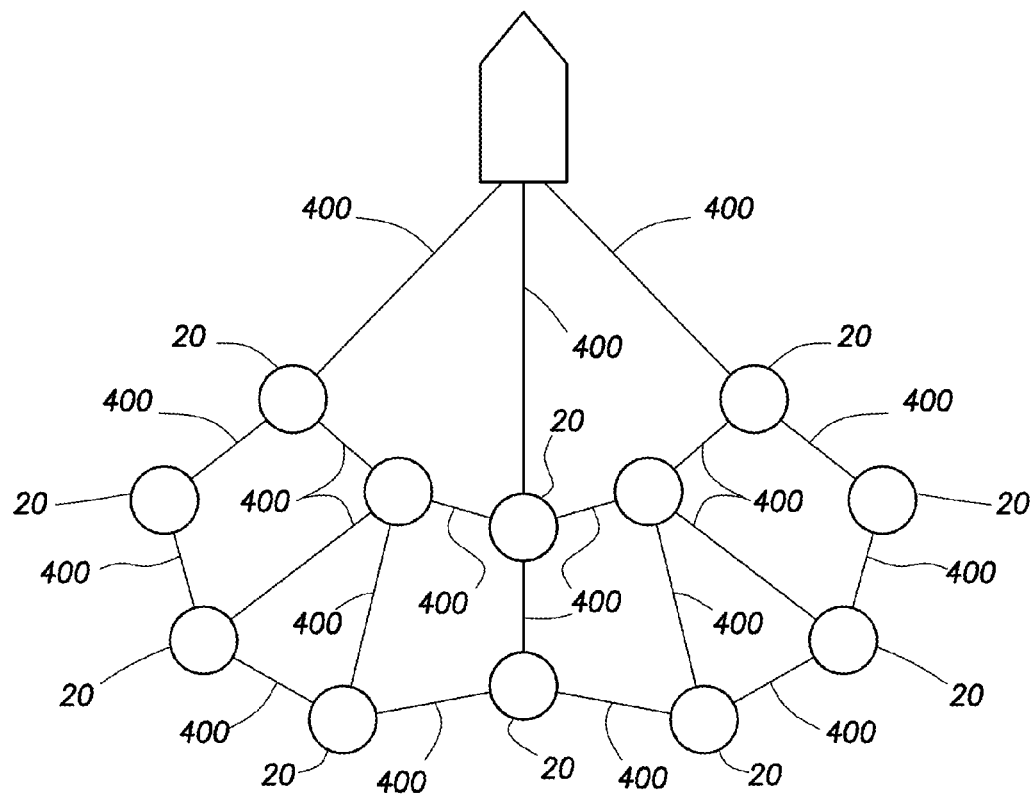
FIG. 6 is a diagram of one possible configuration of using multiple devices off shore when an oil slick exists.

More than one collection system 20 can be used in the sea. As depicted in FIG. 6, multiple collection systems 20 can be used for reducing the amount of the oil in the sea. The collection systems 20 can be connected in various configurations via towing lines 400. Preferably, the configuration is designed to be the most effective in removing as much of the oil from the sea as possible. All of the collection systems 20 can be moved through the sea using only one vessel or multiple systems can be connected to one vessel, while other multiple systems can be connected to another vessel. There can be multiple vessels moving the collection system(s) 20.

According to another embodiment, the device 100 can be used to siphon oil from the seawater. According to this embodiment, at least one component of the device 100 for directing the flow of a fluid is inserted into the portion of the sea. The at least one component can be a portion of the first fluid passageway 101. The portion of the first fluid passageway 101 can be the first fluid inlet 111. In an embodiment, the first fluid inlet 111 is positioned closer to the surface of the sea. In this manner, if the oil is floating on top of the seawater, then the fluid entering the first fluid passageway 101 via the first fluid inlet 111 will be the oil and possibly some of the seawater 200. If the first fluid inlet 111 is positioned farther away from the surface of the sea, then less of the oil will enter the first fluid passageway 101. The at least one component can be repositioned in the sea. This may be useful when one area of the sea has been cleaned of oil, but other areas containing oil remain. The device 100 can further include a pump 801 operatively connected to the first fluid passageway 101. The pump 801 can be a centrifugal pump, a suction pump, or a skimmer pump. The pump 801 can function to draw the fluid from the portion of the sea into the first fluid passageway 101 via the first fluid inlet 111 in a direction of travel from the first fluid inlet 111 towards the pump 801. The pump 801 can be operatively connected to the first fluid passageway 101 at a location upstream of the fluid director 300. As used herein, the phrase "upstream" means closer to the fluid source and is in the opposite direction of fluid flow. The methods can further include the step of causing fluid to flow into the first fluid passageway 101 after the step of inserting. The step of causing can include engaging the pump 801. This can cause the fluid to be drawn into the first fluid passageway 101 via the first fluid inlet 111 in a direction towards the fluid director 300.

According to an embodiment, the device 100 is located on land and a portion of the first fluid passageway 101 is inserted into the portion of the sea. This embodiment may be useful when oil is located close to land, for example, close to a shore or when an oil spill is washed into a central collection pond. In this manner, the pump 801 can draw the oil or oil/seawater mixture 200 through the first fluid passageway 101 towards the fluid director 300. According to another embodiment, the device 100 is located on a vessel and a portion of the first fluid passageway 101 can be inserted into the portion of the sea. This embodiment may be useful when the oil is not located near a shore, but rather is located further off shore.

According to an embodiment, the first fluid passageway 101 comprises more than one fluid inlet. This additional fluid inlet 802 can be used to introduce a fluid into the first fluid passageway 101. The additional fluid inlet 802 can be located upstream from the pump 801. An example of a fluid that may be introduced via the additional inlet 802 is a surfactant. The surfactant can be biodegradable. The surfactant can be used to, inter alia, create a better emulsion of the oil and the seawater.

Figure 7:
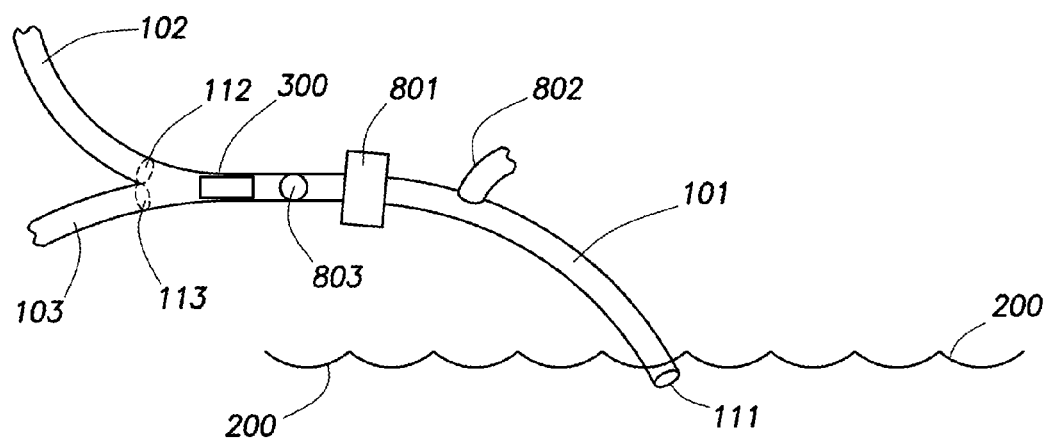
FIG. 7 is a diagram of the device for reducing the amount of oil in a sea when an oil slick exists using a pump.

As can be seen in FIGS. 7 and 8, the device 100 can further include a settling tank 803, wherein the settling tank 803 is connected to the first fluid passageway 101 at a location between the pump 801 and the fluid director 300. The settling tank 803 can allow at least some gravity separation of the phases of an oil/seawater mixture before the fluid flows into the fluid director 300. The settling tank 803 can be various sizes. For example and as shown in FIG. 7, the settling tank 803 can have a relatively small volume. When the settling tank 803 has a relatively small volume, the fluid will not remain in the tank for a very long period of time because the fluid is being pumped through the device 100 at a relatively constant flow rate. When the fluid does not remain in the tank for a very long period of time, there can be a minor amount of settling or separation of the phases of the fluid. By contrast and as shown in FIG. 8, the settling tank 803 can have a relatively large volume. When the tank has a relatively large volume, the fluid can remain in the tank for a longer period of time, which allows for more settling or separation of the fluid. As can be seen in FIG. 8, the phase of the fluid containing the oil or a mixture of the oil and seawater 200 can separate from the phase of the fluid containing only seawater 201. The device 100 can include one fluid director 300 or more than one fluid director 300 (shown in FIGS. 7 and 8, respectively). As shown in FIG. 8, the multiple fluid directors 300 are in parallel. Each fluid director 300 can be positioned at an exit of the settling tank 803. The exits can correspond to a different phase of the fluid in the settling tank 803. For example, one exit can be located on the tank at a location corresponding to the seawater phase 201, while another exit can be located on the tank at a location corresponding to the oil or oil/seawater phase 200. Moreover, one or more exits can be positioned at each corresponding phase of the fluid 200 or 201. In this manner, there may be improved efficiency of the fluid director 300 to direct phase 200 into the second fluid passageway 102 and direct phase 201 into the third fluid passageway 103 (not shown in FIG. 8).

As discussed above, optimally, the device 100 is used to retain or collect only the portion of the fluid that includes oil 200, but is not used to retain the portion of the fluid that includes only seawater 201. As such, the fluid director 300 directs the phase 200 into the second fluid passageway 102 and directs only the seawater phase 201 into the third fluid passageway 103 based on the difference in viscosity or density of the phases. According to this embodiment, any fluid flowing through the second fluid passageway 102 is retained in a collection tank 701 (not shown) and any fluid flowing through the third fluid passageway 103 is not collected.

An advantage for using the device for directing the flow of a fluid 100 is that it can help limit or reduce the amount of oil in a sea. Another advantage is that the device 100 can be used near a wellhead or near the surface of the sea. When used near the surface of the sea, the device 100 can be located on land or off shore. This versatility allows the device to be used in multiple situations for cleaning up oil in a sea.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of limiting the amount of oil in a sea comprising:
    positioning a device for directing the flow of a fluid adjacent to a wellhead,
    wherein the device comprises:
        a first fluid passageway;
        a second fluid passageway;
        a third fluid passageway, wherein the first fluid passageway is operatively connected to the second and third fluid passageways, and wherein the third fluid passageway terminates into the sea; and
        a fluid director,
            wherein the fluid director is operatively connected to the first, second, and third fluid passageways, and
            wherein depending on at least one property of the fluid, the fluid director directs the fluid to increasingly flow into the second or third fluid passageways.

2. The method according to claim 1, wherein the first fluid passageway is connected to a cap.

3. The method according to claim 1, wherein the at least one property is viscosity or density.

4. The method according to claim 3, wherein the fluid director is selected such that as the viscosity of the fluid increases, the director directs the fluid to increasingly flow into the second fluid passageway and as the viscosity decreases, the director directs the fluid to increasingly flow into the third fluid passageway.

5. The method according to claim 3, wherein the fluid director is selected such that as the density of the fluid decreases, the director directs the fluid to increasingly flow into the second fluid passageway and as the density of the fluid increases, the director directs the fluid to increasingly flow into the third fluid passageway.

6. The method according to claim 1, wherein the second fluid passageway is operatively connected to a collection tank.

7. The method according to claim 6, wherein the second fluid passageway terminates at the collection tank.

8. The method according to claim 7, wherein any fluid flowing through the second fluid passageway flows into the collection tank.

9. The method according to claim 1, wherein any fluid flowing through the third fluid passageway is discarded into the sea.

10. A method of reducing the amount of oil in a sea comprising:
    inserting at least one component of a device for directing the flow of a fluid into a portion of a sea, wherein the portion of the sea comprises the oil, and wherein the device comprises:
        a first fluid passageway;
        a second fluid passageway, wherein any fluid flowing through the second fluid passageway flows into a collection tank;
        a third fluid passageway, wherein the first fluid passageway is operatively connected to the second and third fluid passageways, and wherein any fluid flowing through the third fluid passageway is discarded into the sea; and
        a fluid director,
            wherein the fluid director is operatively connected to the first, second, and third fluid passageways, and
            wherein depending on at least one property of the fluid, the fluid director directs the fluid to increasingly flow into the second or third fluid passageways.

11. The method according to claim 10, wherein more than one of the components of the device are inserted into the portion of the sea.

12. The method according to claim 10, wherein the device is part of a collection system.

13. The method according to claim 12, wherein the collection system further includes at least one float and at least one weight.

14. The method according to claim 13, wherein the float, the weight, and the device are configured such that fluid can enter the first fluid passageway and flow towards the fluid director.

15. The method according to claim 14, wherein the float and the weight are configured such that the flow rate of the fluid entering the first fluid passageway is relatively constant.

16. The method according to claim 10, further including the step of moving at least the device through the sea.

17. The method according to claim 10, wherein the at least one component is a portion of the first fluid passageway.

18. The method according to claim 17, wherein the device further includes a pump operatively connected to the first fluid passageway.

19. A method of limiting the amount of oil in a sea comprising:
  positioning a device for directing the flow of a fluid adjacent to a wellhead, wherein the device comprises:
    a first fluid passageway;
    a second fluid passageway;
    a third fluid passageway, wherein the first fluid passageway is operatively connected to the second and third fluid passageways; and
    a fluid director,
      wherein the fluid director is operatively connected to the first, second, and third fluid passageways,
      wherein depending on at least one property of the fluid, the fluid director directs the fluid to increasingly flow into the second or third fluid passageways,
      wherein the at least one property is viscosity or density,
      wherein the fluid director is selected such that as the viscosity of the fluid increases, the director directs the fluid to increasingly flow into the second fluid passageway and as the viscosity decreases, the director directs the fluid to increasingly flow into the third fluid passageway, and
      wherein the fluid director is selected such that as the density of the fluid decreases, the director directs the fluid to increasingly flow into the second fluid passageway and as the density of the fluid increases, the director directs the fluid to increasingly flow into the third fluid passageway.

20. A method of reducing the amount of oil in a sea comprising:
  inserting at least one component of a device for directing the flow of a fluid into a portion of a sea, wherein the portion of the sea comprises the oil, and wherein the device comprises:
    a first fluid passageway;
    a second fluid passageway;
    a third fluid passageway, wherein the first fluid passageway is operatively connected to the second and third fluid passageways;
    at least one float;
    at least one weight; and
    a fluid director,
      wherein the fluid director is operatively connected to the first, second, and third fluid passageways, and
      wherein depending on at least one property of the fluid, the fluid director directs the fluid to increasingly flow into the second or third fluid passageways.

21. The method according to claim 20, wherein the float, the weight, and the device are configured such that fluid can enter the first fluid passageway and flow towards the fluid director.

22. The method according to claim 21, wherein the float and the weight are configured such that the flow rate of the fluid entering the first fluid passageway is relatively constant.

* * * * *